United States Patent [19]

Friedl et al.

[11] 4,214,516
[45] Jul. 29, 1980

[54] BARBECUE OVEN

[76] Inventors: V. L. Friedl, 389-35th Ave., Lachine, Quebec; B. Mascetti, 8146 Giguere, Lasalle, Quebec, both of Canada

[21] Appl. No.: 10,608

[22] Filed: Feb. 8, 1979

[51] Int. Cl.³ ............................................. A47J 37/04
[52] U.S. Cl. ................... 99/421 P; 99/327; 99/447
[58] Field of Search ................ 99/421 P, 325, 327, 99/332, 335, 446–447; 16/19, 131–132, DIG. 39; 126/190; 292/73, 252, 263

[56] References Cited

U.S. PATENT DOCUMENTS

| | | | |
|---|---|---|---|
| 1,476,215 | 12/1923 | Pace | 99/421 P |
| 1,827,595 | 10/1931 | MacGuire | 292/263 UX |
| 2,482,601 | 9/1949 | Spartalis | 99/421 P |
| 2,815,018 | 12/1957 | Collins | 292/73 X |
| 2,917,988 | 12/1959 | Harris | 99/327 |
| 2,927,479 | 3/1960 | Pritz | 99/421 P X |
| 2,939,383 | 6/1969 | Kanaga | 99/327 |
| 2,946,902 | 7/1960 | Hagen | 99/327 UX |
| 3,604,341 | 9/1971 | Coroneos | 99/447 X |
| 3,832,989 | 9/1974 | Belford | 99/447 X |

FOREIGN PATENT DOCUMENTS 555893  1/1957  Italy ........................ 99/421 P Primary Examiner—Harvey C. Hornsby
Assistant Examiner—Arthur O. Henderson
Attorney, Agent, or Firm—Guy J. Houle; Alan Swabey; Robert Mitchell

[57] ABSTRACT

A barbecue oven comprising a barbecue compartment having a door hingedly mounted in a door opening in a front wall of the compartment and spaced from a top and bottom wall thereof. A heating unit is provided in the barbecue compartment and having an elongate heat-radiating surface disposed the side walls and positioned between a top edge of the door opening and the top wall to radiate heat downwardly towards a spit turret in the compartment. The spit turret is drivingly secured in the compartment between the side walls and disposed in the path of radiation of the radiating surface. Drive means is provided to rotate the turret. A liquid collecting tray is provided in at least a portion of the bottom wall below the spit turret to collect hot liquids dripping from foodstuff supported by the spit turret.

13 Claims, 9 Drawing Figures

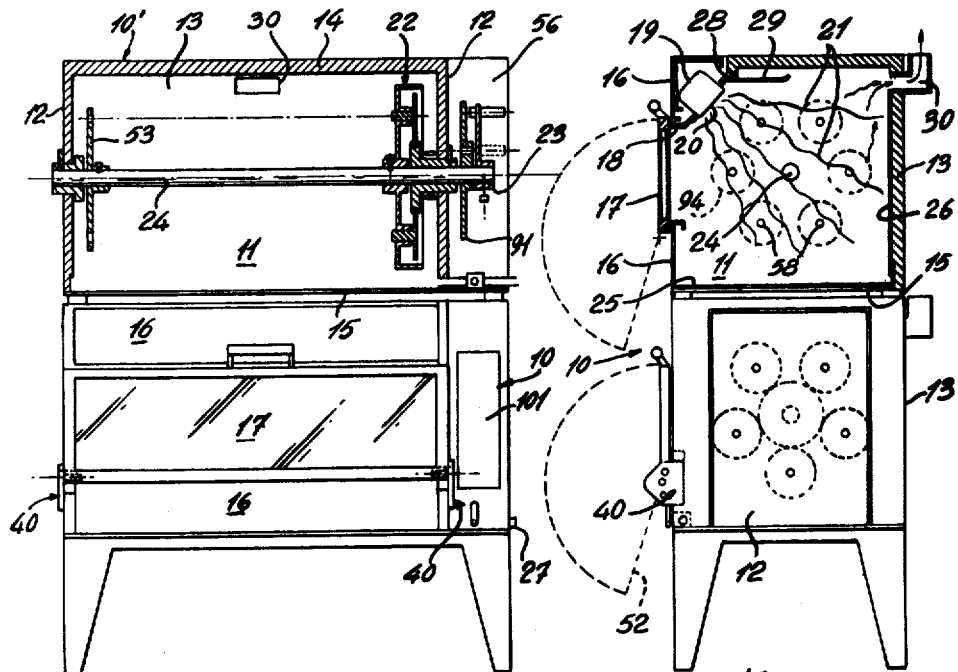
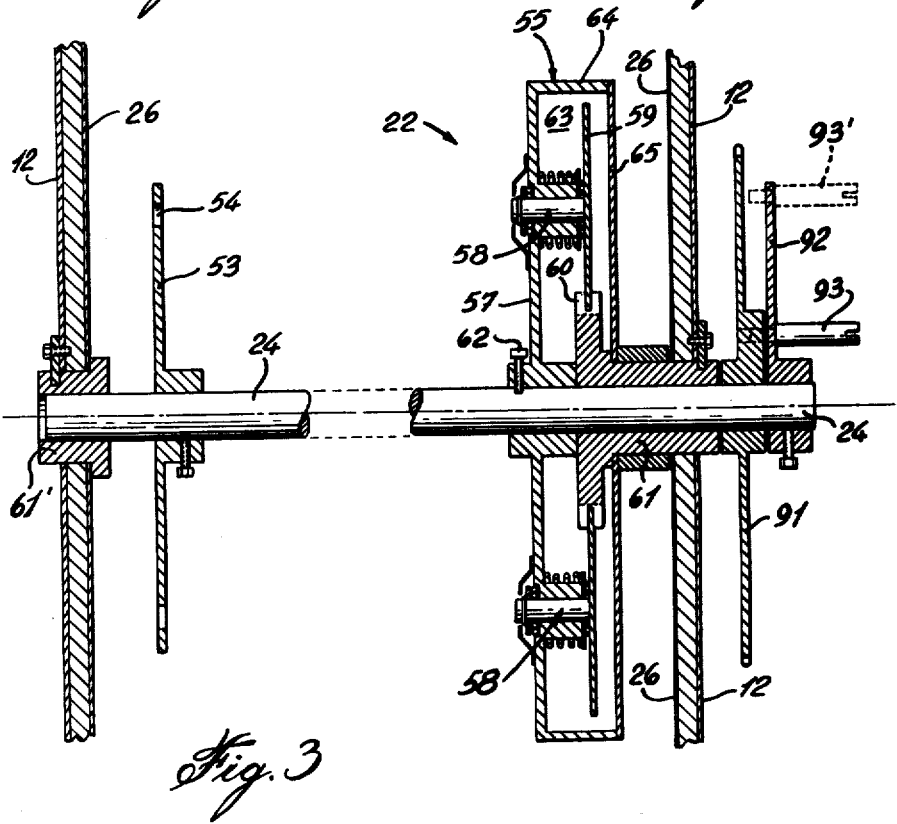

BARBECUE OVEN

BACKGROUND OF INVENTION (a) Field of the Invention

The present invention relates to a barbecue oven and more particularly to improvements in the construction of such ovens wherein there is provided a heating unit disposed between a top edge of a door opening and a top wall of the unit to radiate heat downwardly toward a centerline of a turret and in interference with a spit turret whereby foodstuff on the turret will be cooked and the drippings thereof will be collected at the bottom of the oven, completely away from the heating unit.

(b) Description of Prior Art

Various types of cooking or heating ovens have heretofore been provided as exemplified by U.S. Pat. Nos. 3,074,360; 2,927,479 or 2,855,842. These are only examples of prior art ovens of the type described herein. These exemplify some of the problems solved by the present invention. There has long existed the need to provide a barbecue oven that can cook foodstuff quickly and equally and which is constructed for easy use and cleaning and which is not hazardous.

SUMMARY OF INVENTION

It is an object of the present invention to provide an improved barbecue oven which provides quick and equally finished cooking, which is safe and easy to operate, and easy to clean.

Another object of the present invention is to provide a barbecue oven having a heating unit which combines infrared and convection heating and arranged whereby the heating unit is isolated from hot liquid drippings of foodstuff being cooked.

Another object of the present invention is to provide a turret arrangement wherein the drive mechanism is sealed from the interior of the oven to prevent ingress of liquids from foodstuff into the drive mechanism.

Another object of the present invention is to provide a barbecue oven which is easy to operate and clean and which is compact in construction and further providing the stacking of two or more of the ovens.

According to the above features, from a broad aspect, the present invention provides a barbecue oven comprising a barbecue compartment defined by vertical spaced-apart side walls, a back wall, a top and bottom wall, and a front wall. A door is hingedly mounted in a door opening in the front wall and spaced from the top and bottom walls. A heating unit is provided in the barbecue compartment and having an elongate heat-radiating surface disposed intermediate the side walls and positioned between a top edge of the door opening and the top wall to radiate heat downwardly towards the spit turret. A spit turret is drivingly secured in the compartment between the side walls and disposed in the path of radiation of the radiating surface. Drive means is provided to rotate the turret. A liquid collecting tray is provided in at least a portion of the bottom wall below the spit turret to collect hot liquids dripping from foodstuff supported by the spit turret.

BRIEF DESCRIPTION OF DRAWINGS

A preferred embodiment of the present invention will now be described with reference to the examples thereof illustrated by the accompanying drawings in which:

FIG. 1 is a front view of the barbecue oven having a further oven stacked thereon which is partly fragmented;

FIG. 2 is a side view of FIG. 1 also having the upper stacked oven partly fragmented;

FIG. 3 is a fragmented section view of the spit turret construction;

FIG. 8b is an end view of FIG. 8a.

DESCRIPTION OF PREFERRED EMBODIMENTS

Figure 4:
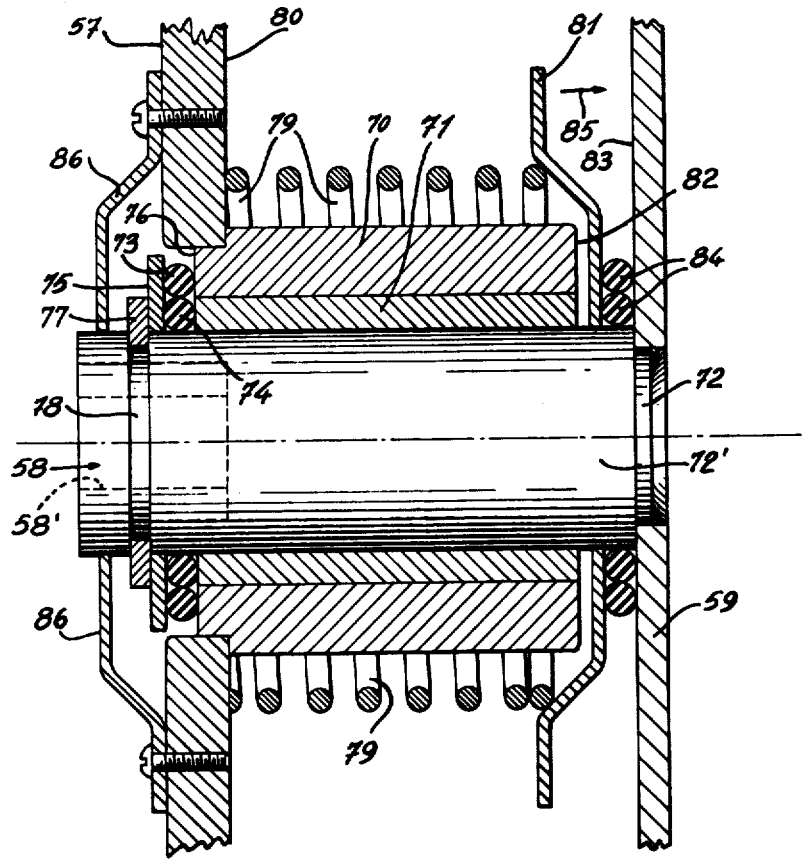
FIG. 4 is a fragmented partly sectioned view of the construction of the pressure seal bearing member.

Referring now to the drawings, and more particularly to FIGS. 1 and 2, there is shown generally at 10, the barbecue oven of the present invention. As shown in these figures, a further barbecue oven 10' is stacked on top of the barbecue oven 10 and additional ovens may be stacked if required. The oven 10 defines a barbecue compartment 11 which is defined by vertical spaced-apart side walls 12, a back wall 13, a top and bottom wall 14 and 15, respectively, and a front wall 16. A door 17 is hingedly mounted in a door opening 18 in the front wall, which opening is spaced from the top and bottom walls.

As illustrated in FIG. 2, a heating unit 19 is provided in the barbecue compartment 11 and has an elongate heat-radiating surface 20 (not fully illustrated) which extends substantially between the side walls 12 and which is positioned between a top edge of the door opening 18 and the top wall 14 whereby to radiate heat downwardly towards the centerline of the turret shaft 24 as illustrated by the heat radiating flow lines 21.

A spit turret 22 is drivingly secured in the compartment 11 between the side walls 12 and is disposed in the path of radiation, indicated by the flow lines 21, whereby foodstuff supported on skewers (not shown) and supported by the turret 22 will be rotated and moved in interference with the path of radiation. Suitable drive means 23 is provided to impart rotational drive to a drive shaft 24 which operates the spit turret 22.

A liquid collecting tray 25 is formed above the bottom wall 15 to collect hot liquid drippings from the foodstuff being supported by the turret and cooked within the oven. The inside walls of the oven are preferably lined with a stainless steel sheet 26 for ease of cleaning and sanitary purposes. The drippings within the tray 25 can be collected automatically during cooking by providing an output pipe 27 which may be connected to conduits or which may have a valve therein permitting periodic drainage of liquids within the tray 25.

Referring again to FIG. 2, the heating unit 19 is an infrared heater having the heat-radiating surface 20 thereof constructed as a gas conductive porous ceramic rectangular surface or electrically heated elements. It can be seen that the plane of the heat radiating surface 20 is angulated to face the spit turret 22. Further, the heating unit 19 is secured on a mounting bracket 28 which incorporates a heat deflector wall 29 which extends in spaced-apart relationship to the top wall 14 and substantially across the compartment 11 between the side walls 12 a short distance towards the back wall 13. As can be seen, the top wall 14, back wall 13 and side walls 12 are thick insulated walls. The reason for this is that the majority of the heat is concentrated towards these walls.

The purpose of the heat deflector wall 29 is to transmit convection heat in the compartment 11 from the heating surface 20 and in the direction of the spit turret to increase the temperature in the compartment 11 and to create heat flow in combination with the vent opening 30 provided in a top portion of the back wall 13. This vent opening 30 is provided to suitable piping (not shown) and the air carrying fumes is evacuated outwardly of a room. The heat deflector wall 29 may also be provided with a plurality of fins (not shown) on the outer heating surface thereof. This would provide a larger surface area to be heated to generate more convection heat within the oven. However, the deflector wall construction as shown in FIG. 2 has been found satisfactory for the dimension of the oven herein shown.

Figure 5:
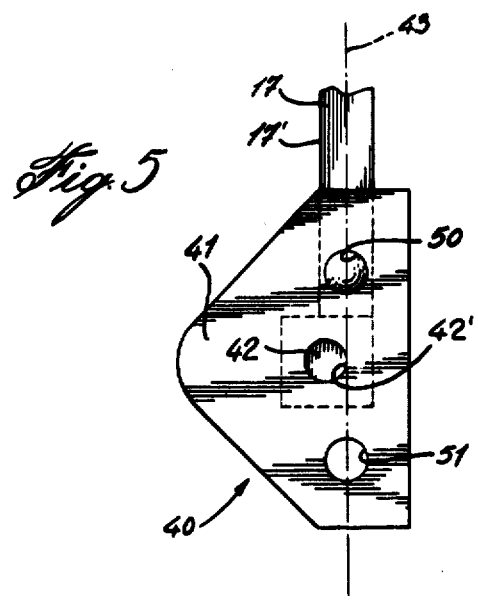
FIG. 5 is an enlarged fragmented end view of the pressure applying hinge.
Figure 6:
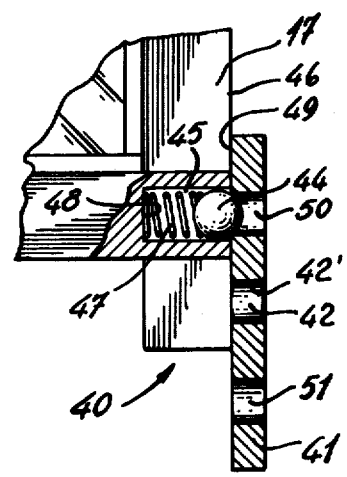
FIG. 6 is a fragmented front view of the pressure hinge of FIG. 5.

Referring now additionally to FIGS. 5 and 6, there is shown the construction of a pressure applying hinge 40 which secures the door 17 to the front wall 16. Such a hinge 40 is provided in a respective lower side edge of the front door and is constructed such as to provide closing pressure against the door when positioned towards its closed position as shown in FIG. 2.

As shown in FIGS. 5 and 6, the hinge 40 comprises a hinge flange 41 which is conveniently secured to the front wall 16 at right angles thereto, thus extending outwardly from the front wall 16. A hinge pin 42 is secured in each lower marginal side edge of the door 17 and secured for axial rotation in a respective hinge bore 42' provided in the flange 41 and located a predetermined distance from the front wall 16 of the unit and substantially in alignment with the front wall 17' of the door 17 and forwardly of the central plane 43 of the door. A spring-loaded ball 44 is located in a ball cavity 45 provided in each marginal side edge 46 of the door. A helical coil spring 47 is located within the ball cavity 45 between an end wall 48 and the ball 44 to exert outward pressure on the ball 44. Thus, the ball is constantly biased under outward pressure and retained within the cavity 45 by the inner surface 49 of the flange 41.

A ball receiving bore 50 is provided in the hinge flange 41 and offset from the central longitudinal axis of the hinge pin 42 and positioned to receive a portion of the spring-loaded ball therein to cause the ball to exert forward biasing pressure on the door 17 towards the door opening 18. Of course, the bore 50 is of smaller diameter than the diameter of the ball 44 whereby the ball will only partly enter within the cavity 50. The cavity 50 is located between the front wall 16 of the oven and the hinge pin and above the hinge pin. A further ball receiving cavity 51 is positioned below the hinge pin at a convenient location to retain the door in a downward open position 52 as illustrated in phantom lines in FIG. 2. It can be seen that with this type of pressure-applying hinge arrangement, the door is completely sealed about the door opening 18 and very little force is required to open the door from its closed position. Further, this eliminates the need of cantilever weights which usually results in large door structures providing interference to prevent stacking ovens one on top of the other.

Referring now to FIG. 3, there is shown the construction of the spit turret 22. As previously described, the spit turret is secured on a rotatable drive shaft 24. The spit turret comprises a skewer support disc 53 which is located adjacent one end of the drive shaft 24 and conveniently secured thereto. This disc is provided with a plurality of bores 54 to removably secure skewers (not shown) thereinto. Other skewer supporting means may also be provided instead of bores 54.

A disc-shaped drive drum 55 is secured adjacent the other end of the drive shaft 24 at the end near a drive compartment 56 of the oven 10. The drive drum 55 consists of a disc-shaped front wall 57 having a plurality of skewer engaging sockets 58 secured thereinto and transverse to the plane of the disc 57 and equidistantly spaced along a circumferential axis thereof, whereby the long axis of the sockets 58 extends parallel to the drive shaft 24. Each of the sockets 58 is secured to a respective planetary gear 59 which is rotatably driven by a drive gear 60 which is formed on a self-aligning bearing 61. As the drive shaft 24 is rotating, the drive gear 60 will impart rotation to the planetary gears 59 and cause the sockets 58 to rotate whereby skewers engaged in the socket cavities 58' (see FIG. 4) will rotate on their long axis. Simultaneously the circular disc front wall 57 of the drive drum 55 will rotate as it is secured by suitable means, such as lock bolt 62, to the drive shaft 24.

Figure 8A:
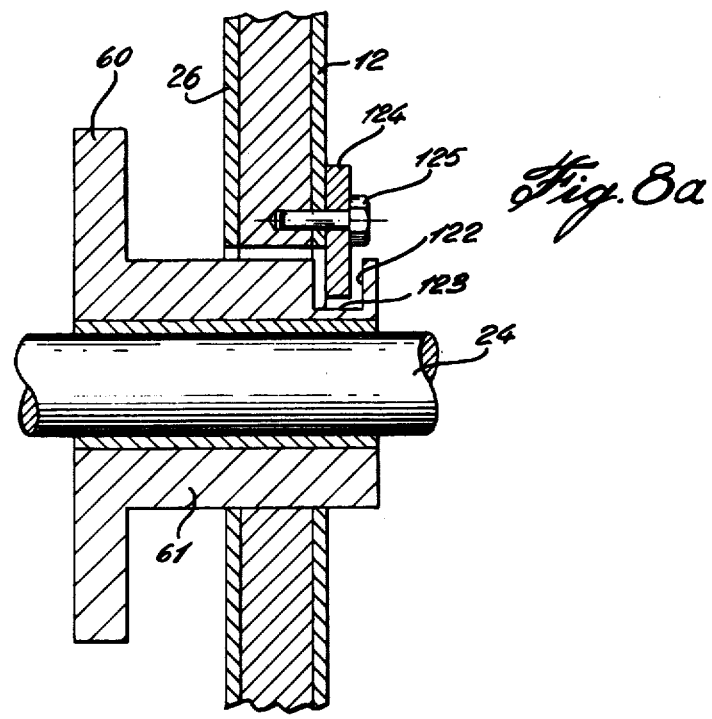
FIG. 8a is a fragmented side view of the self-aligning bearing.
Figure 8B:
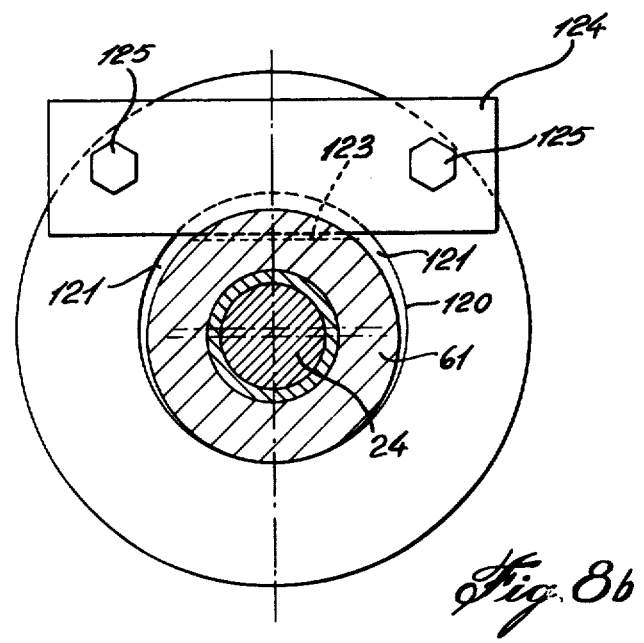

Referring to FIGS. 8a and 8b there is shown the construction of the self-aligning bearing 61 having the drive gear 60 integrally formed therewith. The self-aligning bearing 61' at the other end of the shaft has the same construction features except it is not formed with a gear, but merely supports the end to the shaft 24.

Both bearings 61 and 61' are connected to a respective one of the opposed side walls 12 in an identical manner and therefore only one connection will be described. A circular bore 20 is provided in the wall 12 to support the bearing 60 which is of circular cross-section. As seen clearly in FIG. 8b, the bore 120 is of greater diameter than the diameter of the bearing 61. Thus, a clearance 121 is provided between the bearing 24 and a portion of the circumference of the bore 120.

A wall deflection groove 122 is formed adjacent the end of the bearing 61 and extends transverse to the axis of rotation of the drive shaft 24. The grove 122 is in a portion only of the circumference of the bearing and defines a flat bottom wall 123. A locking key 124 constituted by a flat metal bar is secured by bolts 125 to the wall 24 with a lower portion of the bar extending through the groove 122 and spaced above the bottom wall 123.

The groove 122 is wider and deeper than the thickness and length of the key 124 which extends into the groove, whereby to permit deflection of the side walls about the bearing, when the walls are heated, in order to prevent stress forces on the bearing which in turn would cause wearing of the bearing and shaft.

In order to prevent ingress of liquid drippings from the foodstuff within the socket 58 and the friction bearing sleeves 71 and the gears 59 and 60 within the drum housing 63 (defined by a top wall 64 and rear wall 65 together with front wall 57), each of the sockets 58 are secured by a pressure seal bearing arrangement. Referring now to FIG. 4, there is shown the construction of the pressure seal bearing arrangement and it comprises one or more friction bearing sleeves 71 (concentrically positioned about the outer cylindrical wall 70 of the skewer engaging socket 58 whereby to receive the socket 58 in rotation fit with the friction bearing 71 and within the drum chamber 63). The planetary gear 59 is secured to the inner end 72 of the socket 58. An O-ring front seal arrangement, herein constituted by one or more O-ring seals (shown two 73 and 74) is provided about a forward portion of the socket 58 and are compressed between an O-ring washer 75 and the front face 76 of the friction bearing sleeves 71 and cylindrical wall 70. The O-ring washer 75 is retained in position by a retaining ring 77 secured in a circumferential groove 78 in the forward end of the socket 58. The O-rings 73 and 74 are squeezed between the O-ring washer 75 and the front face 76 of the bearing sleeve 71 and cylindrical wall 70 by pressure applying means which is constituted by a helical spring 79 which is retained about the cylindrical wall 70.

The helical spring 79 is compressed between the inner surface 80 of the disc-shaped front wall 57 and an inner pusher ring 81 which is positioned about the socket 58 in a rear portion thereof and extending between the rear faces 82 of the friction bearing sleeves 71 and the cylindrical wall 70 and the inner face 83 of its associated planetary gear 59. One or more rear O-ring seals 84 or other axial bearing are positioned about the socket 58 between the inner pusher ring 81 and the inner face 83 of the planetary gear 59. It can be seen that the helical spring 79 thus applies outward pressure in the direction of arrow 85 against the pusher ring 81. This pressure is transmitted to the O-ring seals 84 or other axial bearing and to the planetary gear 59 which is secured to the socket 58. Accordingly, the socket 58 is constantly under inward pressure, in the direction of arrow 85, within the drive drum 55. This pressure is transmitted to the O-ring seals 73 and 74 via the O-ring washer 75. Thus, both the front and rear O-rings are under pressure preventing seepage of fluids within the drum. A protective disc flange (cover) 86 provides close sealing about the front portion of the socket.

Preferably, the drive for the spit turret 22 is provided by an electric motor (FIG. 7) designated by numeral 90 and is conveniently housed within the drive compartment 56. The electric motor has an output drive (not shown) which engages a drive gear 91 (see FIGS. 1 and 3) to transmit rotational drive to the drive shaft 24 through a crank arm 92, which is secured to the free end of the drive shaft 24 and is provided with a crank coupler 93 which couples the drive gear 91 to a crank arm 92. In case of power failure the crank coupler 93 is relocated to the end of the crank arm 92 in position 93'. This disengages the drive gear 91 and the system may be operated manually whereby the gas burner does not need electricity to operate the turret.

Figure 7:
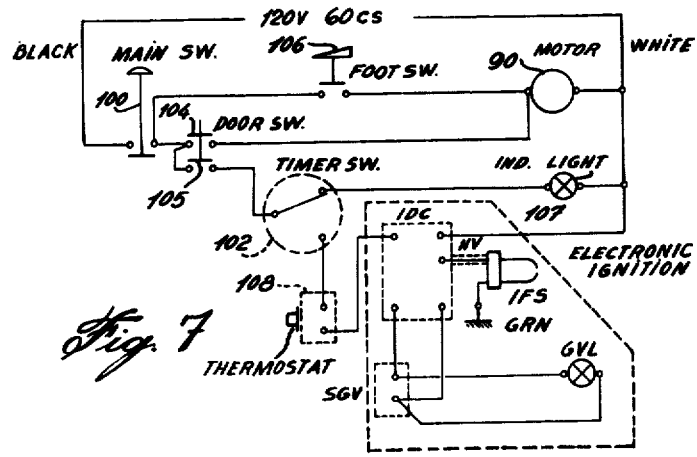
FIG. 7 is an electrical switching diagram of the electrical circuit of the oven.

Referring to FIG. 7, there is shown the electrical switching arrangement with the drive motor 90. A main switch 100 is conveniently located on a control panel 101 (see FIG. 1) on the oven front wall 16 along with the timer switch 102, which automatically operates the cooking cycle and causes gas or electricity for the heating unit 19 to shut off when the cycle is complete. The door switches 104 and 105 are secured within the door 17 and cut off the power to the motor 90 and the timer switch 102, when the door 17 is in an open position. A foot switch 106 is provided in parallel with the door switch 104 to connect the power to the motor 90 in case the door 17 is open if it is desired to load or unload the skewers (not shown) from the turret. By depressing the foot switch 106 momentarily the turret is rotated in increments to position the skewers alternately to the position 94 adjacent the door 17 (see FIG. 2). The indicator light 107 is mounted on the control panel 101 to indicate that the heating unit 19 is deenergized by the timer 102 at the end of the cooking cycle. Whenever the motor 90 is switched off, the heating unit 19 is also switched off. If the heating unit 19 was left operable, the foodstuff closest to that heater would be overcooked and may burn due to excess heat. The thermostat switch 108 maintains the preset temperature by switching on and off the gas or electricity to the heating unit 19.

It is within the ambit of the present invention to provide any obvious modifications of the example of the preferred embodiment described herein, provided such modifications fall within the scope of the claims appended hereto.

We claim:

1. A barbecue oven comprising a barbecue compartment defined by vertical spaced apart side walls, a back wall, top and bottom walls and a front wall; a door hingedly mounted in a door opening in said front wall and spaced from said top and bottom walls, a heating unit in said barbecue compartment having an elongate heat radiating surface disposed intermediate said side walls and positioned between a top edge of said door opening and said top wall to radiate heat downwardly towards said spit turret, a spit turret drivingly secured in said compartment between said side walls and disposed in the path of radiation of said radiating surface, drive means to rotate said turret, a liquid collecting tray in at least a portion of said bottom wall below said spit turret to collect hot liquids dripping from foodstuff supported by said spit turret, said spit turret having a rotatable drive shaft having a skewer support disc secured adjacent one end thereof, a disc-shaped drive drum secured adjacent the other end thereof, said drive drum having a plurality of skewer engaging sockets therein disposed in a circumferential axis of a front face thereof with their long axis parallel to said drive shaft; each said socket being secured to a planetary gear rotatably driven by a drive gear secured to said rotatable drive shaft to cause rotation of said sockets, said drive drum housing said drive and planetary gears therein; each said socket being secured in a pressure seal bearing arrangement.

2. A barbecue oven as claimed in claim 1, wherein a heat deflector wall is provided in said compartment spaced from said top wall intermediate said heating unit and back wall to transmit convection heat in said compartment from said heating unit in the direction of said spit turret to increase the temperature in said compartment.

3. A barbecue oven as claimed in claim 2, wherein said heat radiating surface is a gas conductive porous ceramic rectangular surface, the plane of said heat radiating surface being angulated to face said spit turret.

4. A barbecue oven as claimed in claim 3, wherein said heat deflector wall is provided with a plurality of fins on an outer heating surface thereof, said convection wall being spaced from said top wall of said barbecue compartment.

5. A barbecue oven as claimed in claim 2, wherein said door is provided with a pressure applying hinge in a respective lower side edge thereof, said hinge applying closing pressure against said door when positioned in a closed position against said door opening.

6. A barbecue oven as claimed in claim 5, wherein said hinge comprises a hinge flange secured to said front wall at right angles thereto, a hinge pin in each lower marginal side edge of said door secured for axial rotation in a respective hinge bore of said flange a predetermined distance from said front wall forwardly of the central plane of said door, a spring loaded ball in each said marginal side edge biased outwardly from a surface of said side edge, a ball receiving bore in said hinge flange offset from the central longitudinal axis of said hinge pin and positioned to receive a portion of said springeloaded ball therein to cause said ball to exert forward biasing pressure on said door toward said door opening.

7. A barbecue oven as claimed in claim 6, wherein said ball receiving cavity is positioned above said hinge pin bore between said hinge pin and said front wall, and a further ball receiving cavity below said hinge pin to retain said door in a downward open position when said door is displaced on its hinge pins clear of said door opening.

8. A barbecue oven as claimed in claim 1, wherein said pressure seal bearing arrangement comprises a housing secured in a front wall of said drive drum, one or more friction bearing sleeves about said socket and received in rotational fit within said housing, said planetary gear being secured to an inner end of said socket, one or more O-ring front seals about said socket forwardly of said friction bearing sleeve and housing, an O-ring washer secured about a forward portion of said socket in front of one or more said O-ring seals, and pressure applying means urging said O-ring flange against said one or more O-ring seals to provide a pressure seal between said socket and said housing to prevent ingress of liquids within said friction bearing sleeves and disc drive drum.

9. A barbecue oven as claimed in claim 8, wherein said pressure applying means is a helical spring about said housing and compressed between an inner surface of said front wall of said drive drum and an inner pusher ring positioned about said socket in a rear portion thereof, a one or more rear O-ring seal about said rear portion between said inner pusher ring and said planetary gear, said helical spring applying pressure against said planetary gear through said rear seal and inner pusher ring to bias said socket inwardly and maintain said front and rear seal under sealing pressure.

10. A barbecue oven as claimed in claim 1 wherein said drive means comprises a drive gear freely rotatable about a drive shaft of said spit turret, a crank arm secured to said drive shaft, a coupler connecting said crank arm to said drive gear to permit said drive shaft to be rotated by said drive gear through said coupler and crank arm when said drive gear is rotated.

11. A barbecue oven as claimed in claim 10 wherein said coupler is securable to an end portion of said crank arm to impart manual rotational displacement to said drive shaft and disconnecting said drive gear from engagement with said drive shaft.

12. A barbecue oven as claimed in claim 1 wherein said drive means includes an electric motor to rotate said spit turret, a timer switch to automatically operate a cooking cycle by energizing said motor for a predetermined cycle, a door switch to deenergize said motor when said door is open and to shut-off said heating unit, and a further switch in parallel with said door switch to energize said motor when said door is open whereby to permit removal of skewers removably secured to said turret.

13. A barbecue oven as claimed in claim 1 wherein said drive gear is in toothed engagement with said planetary gear and secured to a self-aligning bearing extending through a circular bore in one of said side walls, said bore and a bearing connecting portion extending through said wall being of circular cross-section with said bore being of greater diameter, a wall deflection groove in a portion of the circumference of said bearing connecting portion, a locking key secured to said wall and extending into said wall deflection groove, said deflection groove being wider and deeper than the thickness and length of said key portion disposed within said groove to permit said wall to deflect.

* * * * *